(12) United States Patent
Vassilovski et al.

(10) Patent No.: US 11,874,670 B2
(45) Date of Patent: Jan. 16, 2024

(54) V2X INFORMATION ELEMENTS FOR MANEUVER AND PATH PLANNING

(71) Applicant: QUALCOMM Incorporated, San Diego, CA (US)

(72) Inventors: Dan Vassilovski, Del Mar, CA (US); Hong Cheng, Bridgewater, NJ (US); Zhibin Wu, Los Altos, CA (US); Shailesh Patil, San Diego, CA (US); Richard Hovey, Branchburg, NJ (US); Ahmed Kamel Sadek, San Diego, CA (US)

(73) Assignee: QUALCOMM Incorporated, San Diego, CA (US)

(*) Notice: Subject to any disclaimer, the term of this patent is extended or adjusted under 35 U.S.C. 154(b) by 133 days.

(21) Appl. No.: 16/816,904

(22) Filed: Mar. 12, 2020

(65) Prior Publication Data
US 2020/0326726 A1 Oct. 15, 2020

Related U.S. Application Data

(60) Provisional application No. 62/834,251, filed on Apr. 15, 2019.

(51) Int. Cl.
*G05D 1/02* (2020.01)
*G08G 1/09* (2006.01)

(52) U.S. Cl.
CPC ......... *G05D 1/0285* (2013.01); *G05D 1/0212* (2013.01); *G08G 1/093* (2013.01);
(Continued)

(58) Field of Classification Search
CPC .... G05D 1/0285; G05D 1/0212; G05D 1/093; G05D 1/0238; G05D 1/0246;
(Continued)

(56) References Cited

U.S. PATENT DOCUMENTS

2010/0198513 A1* 8/2010 Zeng ............... G01S 13/931
701/300
2013/0279491 A1* 10/2013 Rubin ............... G08G 1/162
370/347

(Continued)

FOREIGN PATENT DOCUMENTS

| CN | 109429196 A | 3/2019 |
| EP | 3527940 A1 | 8/2019 |
| WO | 2019066108 A1 | 4/2019 |

OTHER PUBLICATIONS

"Intelligent Transport System (ITS); Vehicular Communications; Basic Set of Applications; Informative Report for the Collective Perception Service," ETSI TR 103 562, V0.0.14, 650, Route des Lucioles; F-06921 Sophia-Antipolis Cedex—France, Oct. 2018, pp. 1-63.
(Continued)

*Primary Examiner* — Jess Whittington
(74) *Attorney, Agent, or Firm* — Polsinelli/Qualcomm

(57) ABSTRACT

Techniques disclosed provide for enhanced V2X communications by defining information Elements (IE) for V2X messaging between V2X entities. For a transmitting vehicle that sends a V2X message to a receiving vehicle, these IEs are indicative of a detected vehicle model type detected by the transmitting vehicle of a detected vehicle; a pitch rate of the transmitting vehicle, a detected vehicle, or a detected object; a roll rate of the transmitting vehicle, a detected vehicle, or a detected object; a yaw rate of a detected vehicle, or a detected object; a pitch rate confidence; a roll rate confidence; an indication of whether a rear brake light of a detected vehicle is on; or an indication of whether a turning signal of a detected vehicle is on; or any combination thereof. With this information, the receiving vehicle is able to make more intelligent maneuvers than otherwise available through traditional V2X messaging.

24 Claims, 6 Drawing Sheets

(52) U.S. Cl.
CPC ........... *G05D 1/027* (2013.01); *G05D 1/0238* (2013.01); *G05D 1/0246* (2013.01); *G05D 1/0257* (2013.01); *G05D 1/0274* (2013.01); *G05D 1/0278* (2013.01); *G05D 2201/0212* (2013.01); *G05D 2201/0213* (2013.01)

(58) Field of Classification Search
CPC .... G05D 1/0257; G05D 1/027; G05D 1/0274; G05D 1/0278; G05D 2201/0212; G05D 2201/0213; G08G 1/0141; G08G 1/04; G08G 1/096725; G08G 1/096741; G08G 1/09675; G08G 1/096791; G08G 1/0112; H04W 4/40

See application file for complete search history.

(56) References Cited

U.S. PATENT DOCUMENTS

| | | | | |
|---|---|---|---|---|
| 2015/0035685 | A1* | 2/2015 | Strickland | B60Q 9/008 340/901 |
| 2016/0368492 | A1* | 12/2016 | Al-Stouhi | B60W 30/09 |
| 2017/0330456 | A1* | 11/2017 | Miller | G08G 1/096758 |
| 2017/0358204 | A1* | 12/2017 | Modica | G08G 1/0141 |
| 2018/0114076 | A1* | 4/2018 | Miller | B60R 1/00 |
| 2019/0043360 | A1* | 2/2019 | Weinfield | H04W 24/06 |
| 2019/0049948 | A1* | 2/2019 | Patel | G05D 1/0276 |
| 2019/0051168 | A1* | 2/2019 | Du | G08G 1/0112 |
| 2019/0088041 | A1* | 3/2019 | Lee | G07C 5/085 |
| 2019/0088148 | A1* | 3/2019 | Jacobus | G08G 1/096716 |
| 2019/0239040 | A1* | 8/2019 | Va | H04W 4/46 |
| 2019/0370569 | A1* | 12/2019 | Gulati | G01S 17/58 |
| 2020/0077238 | A1* | 3/2020 | Alexander | H04W 4/40 |

OTHER PUBLICATIONS

"Intelligent Transport Systems (ITS); Users and applications requirements; Part 2: Applications and facilities layer common data dictionary," ETSI TS 102 894-2, V1.3.1, 650, Route des Lucioles; F-06921 Sophia-Antipolis Cedex—France, Aug. 2018, pp. 1-100.

"Intelligent Transport Systems (ITS); Vehicular Communications; Basic Set of Applications; Part 2: Specification of Cooperative Awareness Basic Service," ETSI EN 302 637-2, V1.4.1, 650, Route des Lucioles; F-06921 Sophia-Antipolis Cedex—France, Apr. 2019, pp. 1-45.

SAE International: "Dedicated Short Range Communications (DSRC) Message Set Dictionary," Surface Vehicle Standard, J2735, Proposed Draft TBD, May 2015, pp. 1-250.

International Search Report and Written Opinion—PCT/US2020/022552—ISA/EPO—dated Jul. 3, 2020.

Hitachi Europe Ltd: "Draft—RTS/ITS-00168 v1.2.9 (TS 102 894-2) Applications and Facilities Layer Common Data Dictionary", ETSI Draft, ITSWG1(17) 040022, European Telecommunications Standards Institute (ETSI), 650, Route Des Lucioles, F-06921 Sophia-Antipolis, France, No. 1. 2. 9, Jun. 27, 2017, XP014297100, 122 Pages, p. 1-p. 13, paragraphs [OA.1], [OA.2], [A.28], [A.32], [A.37] paragraphs [A.50], [A.75], [A.76], [A. 78] paragraphs [A.100], [A.114], [A. 132].

* cited by examiner

V2X INFORMATION ELEMENTS FOR MANEUVER AND PATH PLANNING

RELATED APPLICATIONS

This application claims the benefit of U.S. Provisional Application No. 62/834,251, filed Apr. 15, 2019, entitled "CV2X INFORMATION ELEMENTS FOR MANEUVER AND PATH PLANNING," which is assigned to the assignee hereof, and incorporated by reference herein in its entirety.

BACKGROUND

For autonomous and semi-autonomous vehicles, vehicle maneuver planning and path planning are dictated by the vehicle environment. This environment includes surrounding features such as vehicles, objects, and obstacles. Inaccurate knowledge of the static and dynamic characteristics of these surrounding features can reduce the ability of a vehicle to predict their motion and as a result to accurately and safely plan its own maneuvers. With no knowledge of surrounding vehicle expected behavior, vehicle path planning must assume the most conservative plan, resulting in longer times for inter-vehicle maneuvers, increased inter-vehicle separations, and potential cancellation of desired maneuvers. An accurate knowledge of surrounding feature characteristics improves the efficiency, accuracy, and safety of a vehicle's planned maneuvers.

Vehicle-to-everything (V2X) is a communication standard for exchanging information between V2X-capable vehicles, and between V2X-capable vehicles and other V2X-capable entities, such infrastructure-based devices, pedestrians, cyclists or other road users. Specific forms of vehicular communications, such as Vehicle-to-Vehicle (V2V) communications, Vehicle-to-Infrastructure (V2I) communications, and Infrastructure-to-Vehicle (I2V) communications, therefore may be considered as different types of V2X communications. Further, Cellular-V2X (CV2X) is a type of V2X that uses cellular-based communication such as long-term evolution (LTE), fifth generation (5G), and/or other cellular technologies in a direct-communication mode as defined by the 3rd Generation Partnership Project (3GPP). Other types of V2X may use other wireless communication technologies, such as Dedicated Short-Range Communications (DSRC), Wi-Fi, and the like.

V2X allows information exchange between V2X-capable vehicles, V2X-capable road users and V2X-capable infrastructure entities to enable all of these entities to achieve an improved knowledge of their immediate surroundings, and the surroundings beyond their immediate field of view, with this enhanced environmental awareness termed cooperative sensing. The information exchanged via V2X by V2X-capable vehicles may be of two categories: (1) information describing the characteristics of the transmitting vehicle, and (2) information describing the characteristics of the transmitting vehicle's environment. Category (1) may include the vehicle's own static and dynamic characteristics as determined from vehicle sensors (examples may include, but are not limited to, vehicle size, speed, heading, orientation, etc.), as well as vehicle intentions, such as planned maneuvers. Category (2) may include, but is not limited to, detected environmental features, such as other vehicles, other road users, road conditions (obstructions, obstacles), weather conditions, etc. Other V2X-capable road users may also exchange static and dynamic information about themselves and their surroundings. Similarly, V2X-capable infrastructure entities, commonly-termed road-side units (RSUs), may exchange static and dynamic characteristics of their surroundings as determined by their sensing capabilities via V2X. RSUs may exchange this information with V2X-capable vehicles, V2X-capable road users or other RSUs.

The information received via V2X is carried in Information Elements (IEs), such as those defined by the Society of Automotive Engineers (SAE) in the United States and the European Telecommunications Standards Institute (ETSI) in Europe. Enriching these IEs with data describing characteristics of surrounding vehicles and objects enables a V2X vehicle to make more accurate prediction of detected vehicle or object behavior, and, as a result, plan and execute its own maneuvers more efficiently and safely.

BRIEF SUMMARY

Techniques described herein provide for enhanced V2X communications by defining information Elements (IE) for V2X messaging between V2X entities. For a transmitting vehicle that sends a V2X message to a receiving vehicle, these IEs are indicative of a detected vehicle model type detected by the transmitting vehicle of a detected vehicle; a pitch rate of the transmitting vehicle, a detected vehicle, or a detected object; a roll rate of the transmitting vehicle, a detected vehicle, or a detected object; a yaw rate of a detected vehicle, or a detected object; a pitch rate confidence; a roll rate confidence; a yaw rate confidence; an indication of whether a rear brake light of a detected vehicle is on; or an indication of whether a turning signal of a detected vehicle is on; or any combination thereof. With this information, the receiving vehicle is able to make more intelligent maneuvers than otherwise available through traditional V2X messaging.

An example method of communicating V2X information at a transmitting vehicle, according to this description, comprises obtaining sensor information from one or more sensor inputs, and creating, using a processing unit of the transmitting vehicle, a message comprising an IE conveying at least a portion of the V2X information. The IE is determined from the sensor information and comprises information indicative of a detected vehicle model type of a detected vehicle; a pitch rate of the transmitting vehicle, a detected vehicle, or a detected object; a roll rate of the transmitting vehicle, a detected vehicle, or a detected object; a yaw rate of a detected vehicle or a detected object; a pitch rate confidence; a roll rate confidence; a yaw rate confidence; an indication of whether a rear brake light of a detected vehicle is on; or an indication of whether a turning signal of a detected vehicle is on; or any combination thereof. The method further comprises wirelessly transmitting the message comprising the IE from the transmitting vehicle.

An example method of executing a vehicle maneuver at a receiving vehicle based on V2X information received from a transmitting vehicle, according to this description, comprises wirelessly receiving a message comprising an IE conveying at least a portion of the V2X information. The IE comprises information indicative of a detected vehicle model type detected by the transmitting vehicle of a detected vehicle; a pitch rate of the transmitting vehicle, a detected vehicle, or a detected object; a roll rate of the transmitting vehicle, a detected vehicle, or a detected object; a yaw rate of a detected vehicle, or a detected object; a pitch rate confidence; a roll rate confidence; an indication of whether a rear brake light of a detected vehicle is on; or an indication of whether a turning signal of a detected vehicle is on; or any combination thereof. The method further comprises determining, using a processing unit of the receiving vehicle, a maneuver for the receiving vehicle based, at least in part, on the IE, and causing the receiving vehicle to execute the maneuver.

An example mobile computer system, according to this description, comprises a wireless communication interface, a memory, and one or more processing units communicatively coupled to the wireless communication interface and the memory. The one or more processing units are configured to obtain sensor information from one or more sensor inputs, and create a message comprising an IE conveying at least a portion V2X information included in the message. The IE is determined from the sensor information and comprises information indicative of a detected vehicle model type of a detected vehicle; a pitch rate of a transmitting vehicle, a detected vehicle, or a detected object; a roll rate of the transmitting vehicle, a detected vehicle, or a detected object; a yaw rate of a detected vehicle or a detected object; a pitch rate confidence; a roll rate confidence; a yaw rate confidence; an indication of whether a rear brake light of a detected vehicle is on; or an indication of whether a turning signal of a detected vehicle is on; or any combination thereof. The one or more processing units are further configured to wirelessly transmit the message comprising the IE using the wireless communication interface.

Another example computer system, according to this description, comprises a wireless communication interface, a memory, and one or more processing units communicatively coupled to the wireless communication interface and the memory. The one or more processing units are configured to wirelessly receive a message, via the wireless communication interface, comprising an IE conveying at least a portion of V2X information included in the message. The IE comprises information indicative of a detected vehicle model type detected by a transmitting vehicle of a detected vehicle; a pitch rate of the transmitting vehicle, a detected vehicle, or a detected object; a roll rate of the transmitting vehicle, a detected vehicle, or a detected object; a yaw rate of a detected vehicle, or a detected object; a pitch rate confidence; a roll rate confidence; an indication of whether a rear brake light of a detected vehicle is on; or an indication of whether a turning signal of a detected vehicle is on; or any combination thereof. The one or more processing units are further configured to determine a maneuver for a receiving vehicle based, at least in part, on the IE, and cause the receiving vehicle to execute the maneuver.

Like reference symbols in the various drawings indicate like elements, in accordance with certain example implementations. In addition, multiple instances of an element may be indicated by following a first number for the element with a letter or a hyphen and a second number. For example, multiple instances of an element 110 may be indicated as 110-1, 110-2, 110-3 etc. or as 110*a*, 110*b*, 110*c*, etc. When referring to such an element using only the first number, any instance of the element is to be understood (e.g., element 110 in the previous example would refer to elements 110-1, 110-2, and 110-3 or to elements 110*a*, 110*b*, and 110*c*).

DETAILED DESCRIPTION

Several illustrative embodiments will now be described with respect to the accompanying drawings, which form a part hereof. While particular embodiments, in which one or more aspects of the disclosure may be implemented, are described below, other embodiments may be used and various modifications may be made without departing from the scope of the disclosure or the spirit of the appended claims.

Figure 1:
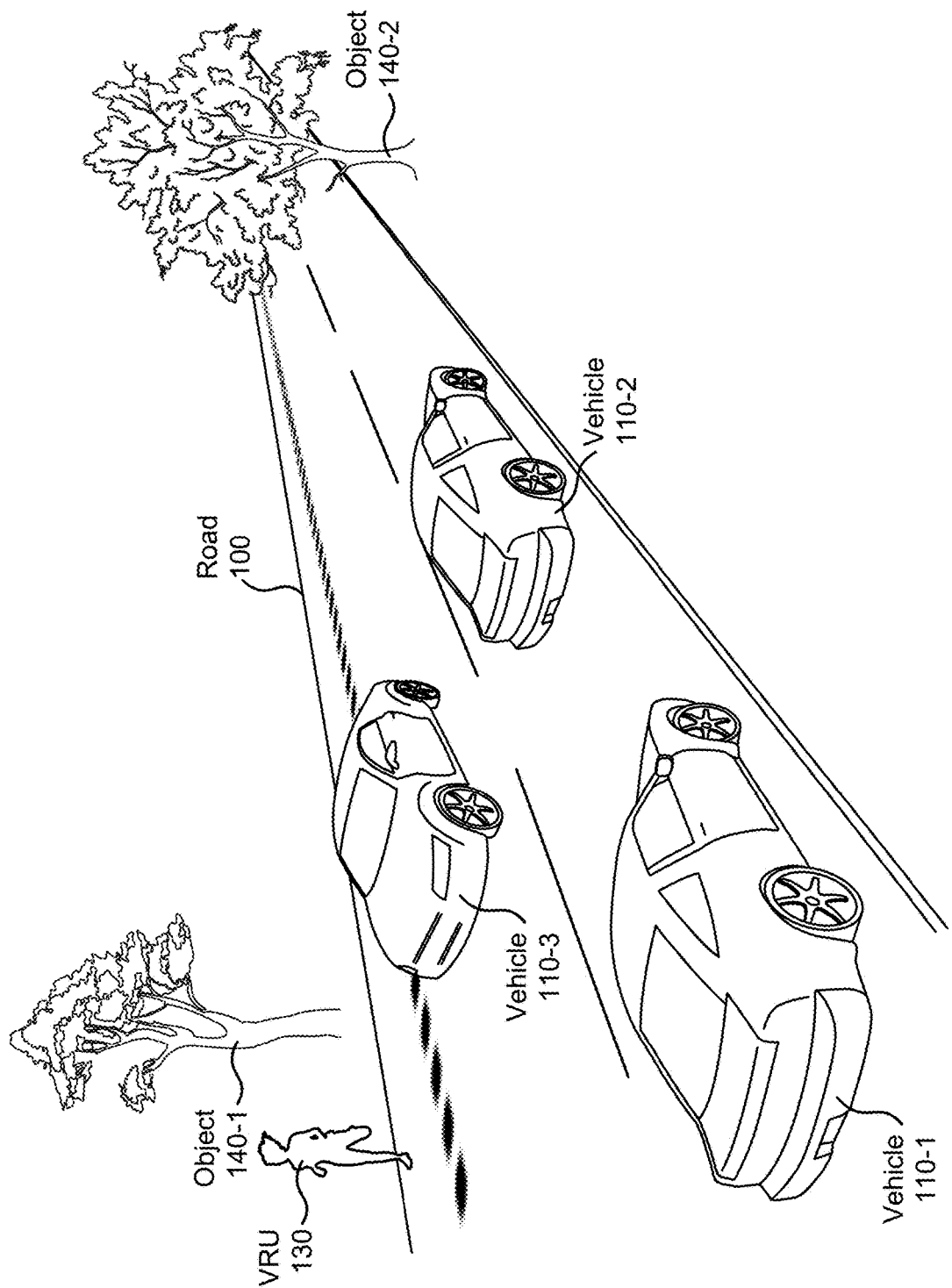
FIG. 1 is a perspective view of a traffic scenario to illustrate how V2X can be utilized by various entities to enhance situational awareness and response from the various vehicles illustrated, according to some embodiments.

FIG. 1 is a perspective view of a traffic scenario to illustrate how V2X can be utilized by various entities to enhance situational awareness and response from the various vehicles illustrated, according to some embodiments. Here, the road 100 is shared by vehicles 110-1, 110-2, and 110-3 (collectively and generically referred to as vehicles 110), and a vulnerable road user 130. Near the road 100 are trees (generically described as objects 140-1 and 140-2, and referred to herein collectively or generically as objects 140). It will be understood, however, that V2X can be utilized in any of a variety of other types of traffic scenarios and environments. Moreover, V2X is capable of communicating information regarding dynamic and/or static characteristics of vehicles (e.g., vehicles 110 and 120), objects off the road 100 (e.g., Vulnerable Road User (VRU) 130 and static objects 140), as well as objects (obstacles) on the road (not illustrated), which may be immobile or mobile, and in addition characteristics of the road. (It should be noted that, as used herein, the terms "obstacles" and "objects" may be used interchangeably, and may refer to mobile and/or immobile objects that may be situated on and/or off the road 100.) This information may be generated by not only by vehicles 110 (e.g., using various sensors incorporated therein, as described below) but also by non-vehicle entities, such as the VRU 130. Additionally, traffic systems may include road-side units (RSUs) (not shown), which comprise dedicated communication units disposed near the road 100 configured to gather, relay, and otherwise facilitate the communication of V2X information. RSUs may also be equipped with sensors to detect vehicles, other road users, such as VRUs, and road obstacles or objects. In addition to gathering and relaying information received from other V2X entities, RSUs may disseminate information gathered from their sensors and/or combine this with information gathered from other road users.

A VRU 130 may comprise any of a variety of entities that share the road 100 with vehicles 110. This can include, for example, pedestrians (e.g., in a pedestrian lane as illustrated in FIG. 1, on a crosswalk, etc.), bicycles, motorcycles, and the like. A VRU 130 may be capable of communicating to a vehicle 110 via V2X communication using, for example, a cell phone or other electronic device capable of wireless communications.

The communication of V2X information can help an autonomous or semi-autonomous vehicle 110 determine a maneuver in countless scenarios. For example, a first vehicle 110-1 following a second vehicle 110-2 may receive information from the second vehicle 110-2 indicative of the second vehicle's intent to slow down, resulting in a determination by the first vehicle 110-1 to slow down to provide additional distance between it and the second vehicle 110-2. The V2X information provided by the second vehicle 110-2 may be transmitted prior to the second vehicle 110-2 applying its brakes, and may therefore give the first vehicle 110-1 additional time to react (rather than simply reacting to sensor or other real-time information that indicates the second vehicle 110-2 is slowing down).

Generally speaking, the more information provided to a vehicle 110 about its environment via V2X, the better the vehicle's ability to determine the most appropriate course of action based on its own intent and on received V2X input. The second vehicle 110-2 can provide, for example, V2X information regarding its size, speed, attitude (i.e., orientation in 6 degrees of freedom (6DOF)), intention (e.g., turn, speed up, slow down, etc.), objects it detects (e.g., object 140-2), V2X information it receives (e.g., from a third vehicle 110-3), and the like. This gives the first vehicle 110-1 much more information than it can gather from its own sensors, giving the automated maneuvering systems of the first vehicle 110-1 a better understanding of the first vehicle's environment, and ultimately allowing the first vehicle 110-1 to make more intelligent maneuvers.

Figure 2:
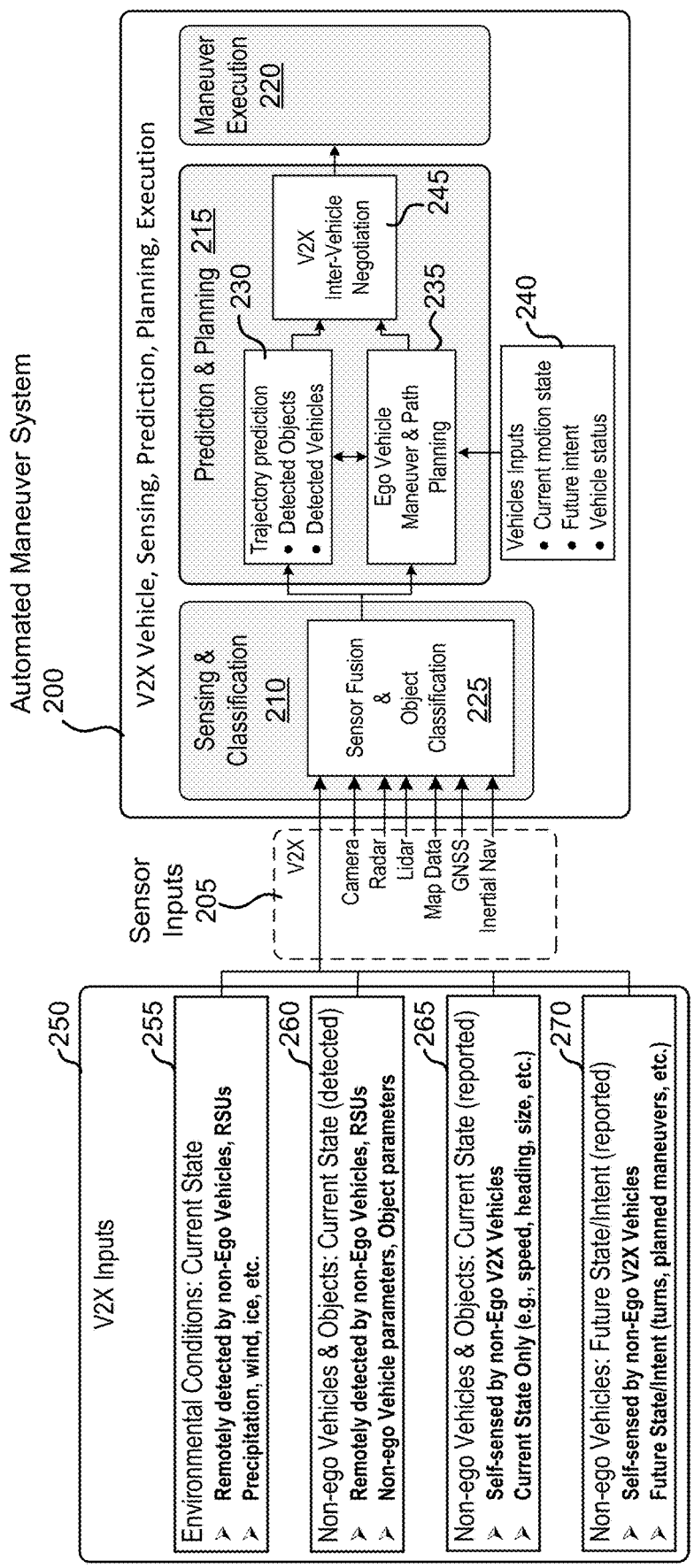
FIG. 2 is a block diagram of an automated maneuver system within a vehicle that can utilize V2X and other information to determine and execute vehicle maneuvers, according to an embodiment.

FIG. 2 is a block diagram of an automated maneuver system 200 within a vehicle 110 that can utilize V2X and other information to determine and execute vehicle maneuvers, according to an embodiment. Arrows indicate data flow. Here, the automated maneuver system 200 may be incorporated into an autonomous or semi-autonomous vehicle 110 for autonomous driving, driver-assist functionality, and/or other vehicle functionality in which autonomous maneuver execution might be utilized. It will be understood that the various components illustrated may be implemented in hardware and/or software by a computer system (e.g., mobile computing system 600 of FIG. 6, described in more detail below). A person of ordinary skill in the art will appreciate that alternative embodiments may add, combine, separate, omit, and/or rearrange the components illustrated in FIG. 2.

As used herein, an "ego vehicle" is a vehicle 110 actively engaged in a behavior, where a "non-ego vehicle" is a separate vehicle 110 from which the ego vehicle may obtain information. This terminology is based on perspective, and can therefore change based on the vehicle 110 being discussed. For example, to an automated maneuver system 200 located on a first vehicle 110-1, the ego vehicle will be the first vehicle 110-2, and the second vehicle 110-2 and third vehicle 110-3 will be non-ego vehicles. On the other hand, to an automated maneuver system 200 located on the second vehicle 110-2, the ego vehicle will be the second vehicle 110-2, and the first vehicle 110-1 will be a non-ego vehicle. Thus, in FIG. 2, an ego vehicle from the perspective of the automated maneuver system 200 is the vehicle for which the automated maneuver system 200 is determining and executing maneuvers.

With regard to the sensor inputs 205 to the automated maneuver system 200, they can come from a variety of sources. These sources can include not only V2X, but also one or more radar, LIDAR, map data, Global Navigation Satellite Systems (GNSS) (such as Global Positioning System (GPS) and/or similar satellite-based positioning technologies), inertial navigation (e.g., based on motion sensors, such as gyroscopes, accelerometers, etc.), and the like. These sources can be located on the ego vehicle. That said, embodiments are not limited to vehicle-based sources.

Data flows through the automated maneuver system 200 and various stages. These stages include a sensing and classification stage 210, a prediction and planning stage 215, and a maneuver execution stage 220. The goal of the automated maneuver system 200 is to determine the most appropriate course of action (vehicle maneuvers) by incorporating environmental conditions with vehicle intent. Environmental conditions are provided through the Sensor Inputs stage 205, consisting of the vehicles own sensors as previously described, and sensor inputs received via V2X from external V2X entities 250. The Sensor Fusion and Object Classification block 225 combines internal and external (V2X) inputs to arrive at classification of the environment external to the vehicle. For those objects classified as dynamic, the sensor inputs are applied to the Trajectory Prediction 230. The Prediction and Planning 215 incorporates the predicted path (trajectory) of sensed objects with the intended path of the vehicle to determine how or if they detected objects or vehicles influence the vehicle's intended path. In the event detected V2X vehicles affect the ego vehicles intended path, the ego vehicle may invoke a V2X negotiation with the affecting vehicle to allow one, the other, or both to modify their intended paths. The effect of the V2X inputs 250 is to augment and enhance the ego vehicle's detection of the environment, enabling the ego vehicle to make the most appropriate choice of maneuver(s). Additional details are provided below.

At the sensing and classification stage 210, data from the various sensor inputs 205 is provide to a sensor fusion and object classification module 225. The sensor fusion and object classification module 225 may comprise software and/or hardware components configured to determine various objects in the ego vehicle's environment. Different sources may include information regarding the same object, and sensor fusion can be used to help ensure the object is seen as a single object, rather than multiple objects. (E.g., for the second vehicle 110-2 in FIG. 1, the object 140-2 may be captured in an image of a camera, captured by LIDAR, and may even be included in map data. Camera and LIDAR processing may identify the object 140-2 from respective camera and LIDAR data, and sensor fusion can be used to determine that the respective objects from camera, LIDAR, and map sources all corresponds to a single object 140-2.) The information provided from components in the sensing and classification stage 210 to components in the prediction and planning stage 215 can include both static and dynamic characteristics of all types of features (e.g. vehicles, objects, and obstacles) in the environment of the ego vehicle.

The prediction and planning stage 215 can include components for trajectory prediction 230 and ego vehicle maneuver and path planning 235. Trajectory prediction 230 can use information about objects (e.g., detected objects and vehicles) to predict their trajectory, and the ego vehicle maneuver and path planning can determine a best maneuver in view of the predicted trajectories of the various objects in the ego vehicle's environment. This can further be in formed by various vehicle inputs 240 from the ego vehicle. These vehicle inputs 240 can include, for example, a current motion state, a future intent (e.g., an intent to turn, speed up, slowdown, etc.), and a vehicle status (e.g., speed, attitude, etc.). Information from both the trajectory prediction 230 and ego vehicle maneuver and path planning 235 can then be passed to V2X inter-vehicle negotiation 245, which can not only communicate the intended maneuver of the ego vehicle to other V2X vehicles, but also relay the information to maneuver execution 220 itself to execute the maneuver. The maneuver execution 220 may include vehicle systems (not shown) to cause the ego vehicle to execute the maneuver. Depending on how the automated maneuver system 200 is integrated into the ego vehicle, this can include components configured simply to relay the maneuver to one or more separate systems of the vehicle to execute the maneuver, or may include the automated systems themselves (e.g., for automated braking, acceleration, steering, etc.).

As noted in FIG. 2, sensor inputs 205 can include V2X inputs, which can include information about various types of features in the ego vehicle's environment, from any of a variety of different sources. This information can include environmental conditions 255, detected non-ego vehicles and objects 260 (their static and dynamic characteristics, as detected by other non-ego V2X entities), reported non-ego vehicles and objects 265 (the static and dynamic characteristics self-determined and self-reported by non-ego vehicles), and reported intent of non-ego vehicles 270 (including self-determined intended or future maneuvers).

The environmental conditions 255 can include conditions regarding any of a variety of features within the environment of the ego vehicle. This can include, for example, weather conditions, such as precipitation, wind, ice, etc. As indicated in FIG. 2, this information can be detected by entities such as non-ego vehicles and RSUs, and communicated via the V2X input to the ego vehicle.

The detected non-ego vehicles and objects 260 may comprise information regarding objects and vehicles detected by a separate entity. The separate entity may comprise, for example, non-ego vehicles, RSUs, or the like. As previously noted, this information can include information regarding both static and dynamic characteristics of features detected in the ego vehicle's environment. Sensors used to detect such objects and vehicles may comprise any of a variety of sensors, including sensor type similar to the sensors illustrated in sensor inputs 205. Indeed, a given vehicle using sensor inputs 205 in its own automated maneuver system 200 may detect such objects and vehicles and communicate this detected information to other vehicles using V2X communication.

The reported non-ego vehicles and objects 265 may comprise information regarding objects and vehicles that is reported by the respective objects and vehicles. Because this information is provided by an object or vehicle using its own sensors to determine and report its own behavior, it may be more accurate than information detected by a first entity attempting to do so remotely about a second entity, depending on the information. It may therefore be weighted by the ego vehicle accordingly.

Finally, the reported intent of non-ego vehicles 270 can include information regarding planned maneuvers reported from non-ego V2X vehicles. That is, for an example in which a first V2X vehicle determines an intended maneuver, the first V2X vehicle may then provide details regarding the intended maneuver to a second V2X vehicle (e.g., via a V2X inter-vehicle negotiation 245). In this example, the second V2X vehicle that receives the information regarding the intended maneuver would correspond to the ego vehicle of FIG. 2, in which the automated maneuver system 200 can utilize the intended maneuver information received from the first V2X vehicle (via the V2X communication link within the sensor inputs 205) to determine its own intended maneuver.

As previously noted, V2X vehicles and other entities can communicate using V2X to communicate information defined by SAE or ETSI. In particular, communication packets (or frames) can include various information fields, and the information fields can include particular information elements (IEs), also known as data elements (DEs), that convey particular types of information. Although current IEs allow V2X entities (acting as V2X inputs 250) to convey the environmental conditions 255, detected non-ego vehicles and objects 260, reported non-ego vehicles and objects 265, and reported intent of non-ego vehicles 270, there are limitations to the current set of IEs used in V2X.

With this in mind, embodiments herein provide for the use of IEs that enhance V2X to allow V2X entities to convey additional information in an accurate manner. For an ego vehicle, this can result in enhanced maneuver prediction and planning, increasing the efficiency of the ego vehicle and the safety of its occupants and others nearby.

A description of these IEs is provided in Table 1, which includes columns indicating the name of the IEs, information conveyed by the IEs when used in messages conveying information detected by a vehicle, information conveyed by the IEs when used in messages conveying information reported by vehicle (if applicable), and a description of how an IE could be utilized in predicted behavior. Additional description of the data elements is provided below.

TABLE 1

V2X Information Element (IE) Summary

| Name | Detected Information | Reported Information | Application of IE to Object Predicted Behavior |
|---|---|---|---|
| Vehicle Model Type | Vehicle Model Type Possible Representation: String or Vehicle Description | - N/A - | Vehicle Model Time enables more accurate determination of vehicle size, maneuverability, stopping. |
| Vehicle/Object Pitch Rate | Detected vehicle or object: Angular velocity of about y-axis Possible Representation: Integer value in steps of 0.01 deg/sec | Ego vehicle: Angular velocity of about y-axis Possible Representation: Integer value in steps of 0.01 deg/sec | More accurate object motion determination. Example: Pitch rate of a detected object or vehicle facilitates prediction of subsequent motion |

TABLE 1-continued

V2X Information Element (IE) Summary

| Name | Detected Information | Reported Information | Application of IE to Object Predicted Behavior |
|---|---|---|---|
| Vehicle/Object Roll Rate | Detected vehicle or object: Angular velocity of about x-axis Possible Representation: Integer value in steps of 0.01 deg/sec | Ego vehicle: Angular velocity of about x-axis Possible Representation: Integer value in steps of 0.01 deg/sec | More accurate object motion determination. Example: Roll rate of a detected object or vehicle facilitates prediction of subsequent motion. |
| Vehicle/Object Yaw Rate | Detected vehicle or object: Angular velocity of about z-axis Possible Representation: Integer value in steps of 0.01 deg/sec | | More accurate object motion determination. Example: Yaw rate of a detected object or vehicle facilitates prediction of subsequent motion. |
| Pitch Rate confidence | 95% confidence for the detected angular velocity in deg/sec. Possible Representation: n-bit enumerated value, each value denoting a confidence level | 95% confidence for the detected angular velocity in deg/sec. Possible Representation: n-bit enumerated value, each value denoting a confidence level | |
| Roll Rate Confidence | 95% confidence for the detected angular velocity in deg/sec. Possible Representation: n-bit enumerated value, each value denoting a confidence level | 95% confidence for the detected angular velocity in deg/sec. Possible Representation: n-bit enumerated value, each value denoting a confidence level | |
| Rear Brake Lights ON | Detected vehicle: Rear brake lights on Possible Representation: Part of n-bit enumerated value, each value denoting vehicle rear light condition | - N/A - | Improves determination a detected vehicle is decelerating or stopped. |
| Rear Brake Lights and Right Turn Signal ON | Detected Vehicle: [Rear Brake lights on] ∩ [RIGHT turn signal on] (e.g., stopped with right turn signal) Possible Representation: Part of n-bit enumerated value, each value denoting vehicle rear light condition | - N/A - | Improves determination a detected vehicle is decelerating and preparing to turn right. |
| Rear Brake Lights and Left Turn Signal ON | Detected Vehicle: [Rear Brake lights on] ∩ [LEFT turn signal on] (e.g., stopped with left turn signal) Possible Representation: Part of n-bit enumerated value, each value denoting vehicle rear light condition | - N/A - | Improves determination a detected vehicle is decelerating and preparing to turn left. |
| Rear Emergency (Hazard) Lights ON | Detected Vehicle: Hazard signals on Possible Representation: Part of n-bit enumerated value, each value | - N/A - | Detected vehicle is experiencing an emergency. |

TABLE 1-continued

V2X Information Element (IE) Summary

| Name | Detected Information | Reported Information | Application of IE to Object Predicted Behavior |
|---|---|---|---|
| Rear Emergency (Hazard) Lights and Rear Brake Lights ON | denoting vehicle rear light condition Detected Vehicle: [Rear Brake lights on] ∩ [BOTH turn signals on] (e.g., stopped with hazard signals on) Possible Representation: Part of n-bit enumerated value, each value denoting vehicle rear light condition | - N/A - | Detected vehicle is experiencing an emergency, decelerating or stopped. |

As indicated in Table 1, the Vehicle Model Type IE may comprise a string or vehicle description. In SAE, this IE may be included in a Basic Safety Message (e.g., DF DetectedObject), or in a separate message. In ETSI, this IE may be included in a Collective Perception Message (e.g., Perceived Object Container) or in a separate message. Depending on the granularity of the information conveyed, Vehicle Model Type can convey (to a receiving V2X entity) an accurate determination of vehicle size, maneuverability, and stopping, for example. That is, Vehicle Model Type may include a high-level description of a vehicle type (e.g., a pickup, large sport-utility vehicle, delivery van, etc.), a particular model type of a detected vehicle, or even a model type and trim. These varying degrees of granularity can enable the receiving V2X entity to determine maneuverability, for example, of the detected vehicle due to known features of the vehicle type (e.g., weight, size, tire type, etc.). As indicated in Table 1, Vehicle Model Type may not be applicable to vehicles transmitting information about themselves because such capabilities may already exist elsewhere within current V2X communication standards.

As an example of where this might be used in a traffic scenario, where a first vehicle 110-1 is following a second vehicle 110-2, the second vehicle 110-2 may want to know information about the first vehicle 110-1 if it intends to brake suddenly. Information about the maneuvering capabilities of the first vehicle 110-1 (e.g., braking, turning radius, etc.) can impact how the second vehicle 110-2 brakes and/or performs additional or alternative maneuvers. In this example, a third vehicle 110-3 may convey information detected about the first vehicle 110-1 using Vehicle Model Type in a message transmitted from the third vehicle 110-3 to the second vehicle 110-2.

Figure 3:
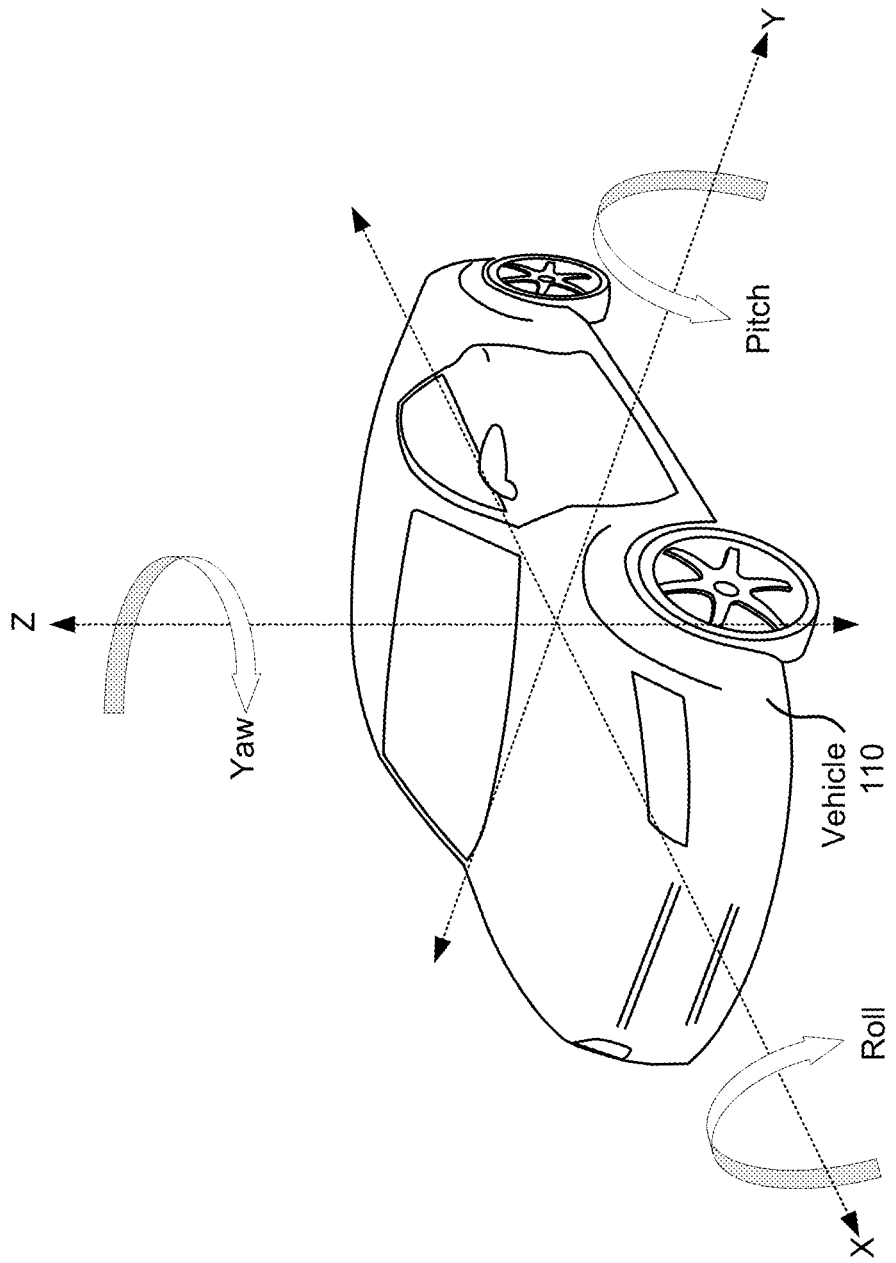
FIG. 3 is a perspective drawing showing a coordinate system that defines pitch, roll, and yaw, of a vehicle, which may be used by some embodiments.

The Vehicle/Object Pitch Rate IE (or simply "Pitch Rate") may comprise a value (e.g., in degrees per second) indicative of an angular velocity of a vehicle or object. For a vehicle, the pitch may be defined as a rotation about a y-axis, as illustrated in FIG. 3. (It can be noted that different standards may use different conventions for pitch, roll, and yaw. As such, Pitch Rate can be adapted to accommodate differing conventions accordingly.) For other objects, the pitch may be defined using a similar standard for the respective object. Knowing change in the pitch and only can be informative regarding the vehicles acceleration and deceleration, it can be helpful in a safety determination, where it may be possible that a sudden change in pitch could be indicative of vehicle loss of control. Similar to Vehicle Model Type, Pitch Rate can be included in a Basic Safety Message for SAE (e.g., DF DetectedObject) and/or a Collective Perception Message for ETSI (e.g., Perceived Object Container), or in other messages. As noted in Table 1, Pitch Rate not only can be included in messages regarding vehicles and objects detected by a V2X vehicle, but also can be included in a message that a V2X vehicle reports about itself.

The Vehicle/Object Roll Rate (or simply "Roll Rate") may comprise a value (e.g., in degrees per second), similar to Pitch Rate, indicative of an angular velocity of a vehicle or object. For a vehicle, roll may be defined as a rotation about an x-axis, as illustrated in FIG. 3. For other objects, the roll may be defined using a similar standard for the respective object. Roll Rate can be indicative of lateral movement of the vehicle and can also be helpful in safety determinations and road condition determinations. Similar to Pitch Rate, Roll Rate can be included in a Basic Safety Message for SAE (e.g., DF DetectedObject) and/or a Collective Perception Message for ETSI (e.g., Perceived Object Container) or in other messages. As noted in Table 1, Roll Rate can be included in messages regarding vehicles and objects detected by a V2X vehicle and/or the messages that a V2X vehicle reports about itself.

Pitch Rate Confidence and Roll Rate Confidence can be values corresponding to Pitch Rate and Roll Rate, respectively, and may convey a confidence level for the respective Pitch Rate and Roll Rate values.

Other IEs in Table 1 include information regarding rear brake lights and turn signals for detected vehicles, for which one representation could be as different bits in an n-based enumerated value. A combination of these bits could therefore mean different things. Where one bit could mean left turn signal is on and another bit could mean a brake light is on, the combination of both bits could mean the rear emergency (hazard) lights are on. The combination of a turning signal and a rear brake light could convey the intent of the vehicle to decelerate and turn. As indicated in Table 1 there are several cases delineated: (1) Rear Brake Lights On, (2) [Rear Brake Lights On] AND [Right Turn Signal On], (3) [Rear Brake Lights On] AND [Left Turn Signal On], (4) [Rear Brake Lights On] AND [Both Turn Signals On] (the same as [Rear Brake Lights On] AND [Hazard Signals On]), and (5) Hazard Signals on. While this information may be conveyed from a V2X entity reporting information about itself, detected information can still be useful. For example, a V2X vehicle may detect this information from a vehicle that is not capable of or correctly reporting V2X information regarding itself.

Figure 4:
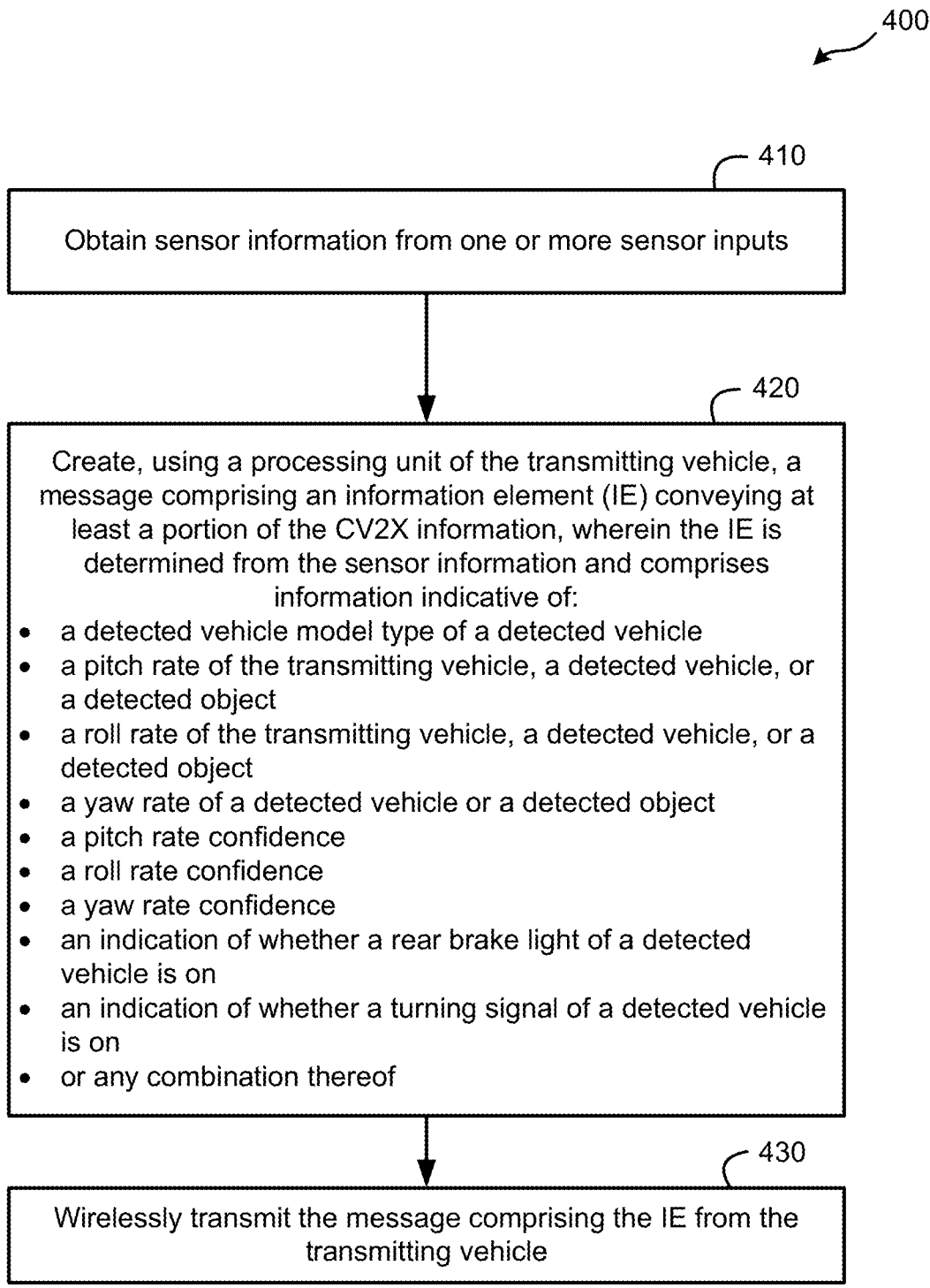
FIG. 4 is a flow diagram of a method of communicating V2X information, according to an embodiment, which can be performed by a transmitting vehicle.

FIG. 4 is a flow diagram of a method 400 of communicating V2X information, according to an embodiment, which can be performed by a transmitting vehicle. Here, a "transmitting" vehicle is a vehicle configured to transmit V2X information, a "receiving" vehicle is a vehicle configured to receive V2X information, and a "detected" vehicle or object is a respective vehicle or object detected using one or more sensor inputs of the transmitting vehicle (which can include V2X information from yet another vehicle, as described above). Alternative embodiments may perform functions in alternative order, combine, separate, and/or rearrange the functions illustrated in the blocks of FIG. 4, and/or perform functions in parallel, depending on desired functionality. A person of ordinary skill in the art will appreciate such variations. Means for performing the functionality of one or more blocks illustrated in FIG. 4 can include sensor inputs 205 and/or an automated maneuver system 200 as illustrated in FIG. 2 and described above, for example. Either of these may be implemented by a processing unit and/or other hardware and/or software components of an on-vehicle computer system, such as the mobile computing system 600 of FIG. 6, described in further detail below.

At block 410, the functionality includes obtaining sensor information from one or more sensor inputs. As noted above, sensor inputs may comprise, for example, a camera, radar, LIDAR, map data, GNSS, or motion sensor, or any combination thereof. Sensor inputs may also include V2X information from yet another vehicle. Means for performing the functionality of block 410 may include a bus 605, processing unit(s) 610, input device(s) 615, working memory 635, and/or other components of a mobile computing system 600 as illustrated in FIG. 6 and described in further detail below.

At block 420, the functionality comprises creating, using a processing unit of the transmitting vehicle, a message comprising an IE conveying at least a portion of the V2X information, wherein the IE is determined from the sensor information and comprises information indicative of a detected vehicle model type of a detected vehicle; a pitch rate of the transmitting vehicle, a detected vehicle, or a detected object; a roll rate of the transmitting vehicle, a detected vehicle, or a detected object; a yaw rate of a detected vehicle, or a detected object; a pitch rate confidence; a roll rate confidence; a yaw rate confidence; an indication of whether a rear brake light of a detected vehicle is on; or an indication of whether a turning signal of a detected vehicle is on; or any combination thereof. As previously noted, the detected vehicle model type may comprise information regarding a type of vehicle, a vehicle model, a vehicle model trim, or any combination thereof. Means for performing the functionality of block 420 may include a bus 605, processing unit(s) 610, input device(s) 615, working memory 635, and/or other components of a mobile computing system 600 as illustrated in FIG. 6 and described in further detail below.

At block 430, the functionality comprises wirelessly transmitting the message comprising the IE from the transmitting vehicle. This wireless transmission can be received, for example, by a receiving vehicle capable of determining a vehicle maneuver based at least in part on the IE. As previously noted, the message may be compliant with SAE and/or ETSI standards, and may comprise any of a variety of types of message from the standards.

Figure 6:
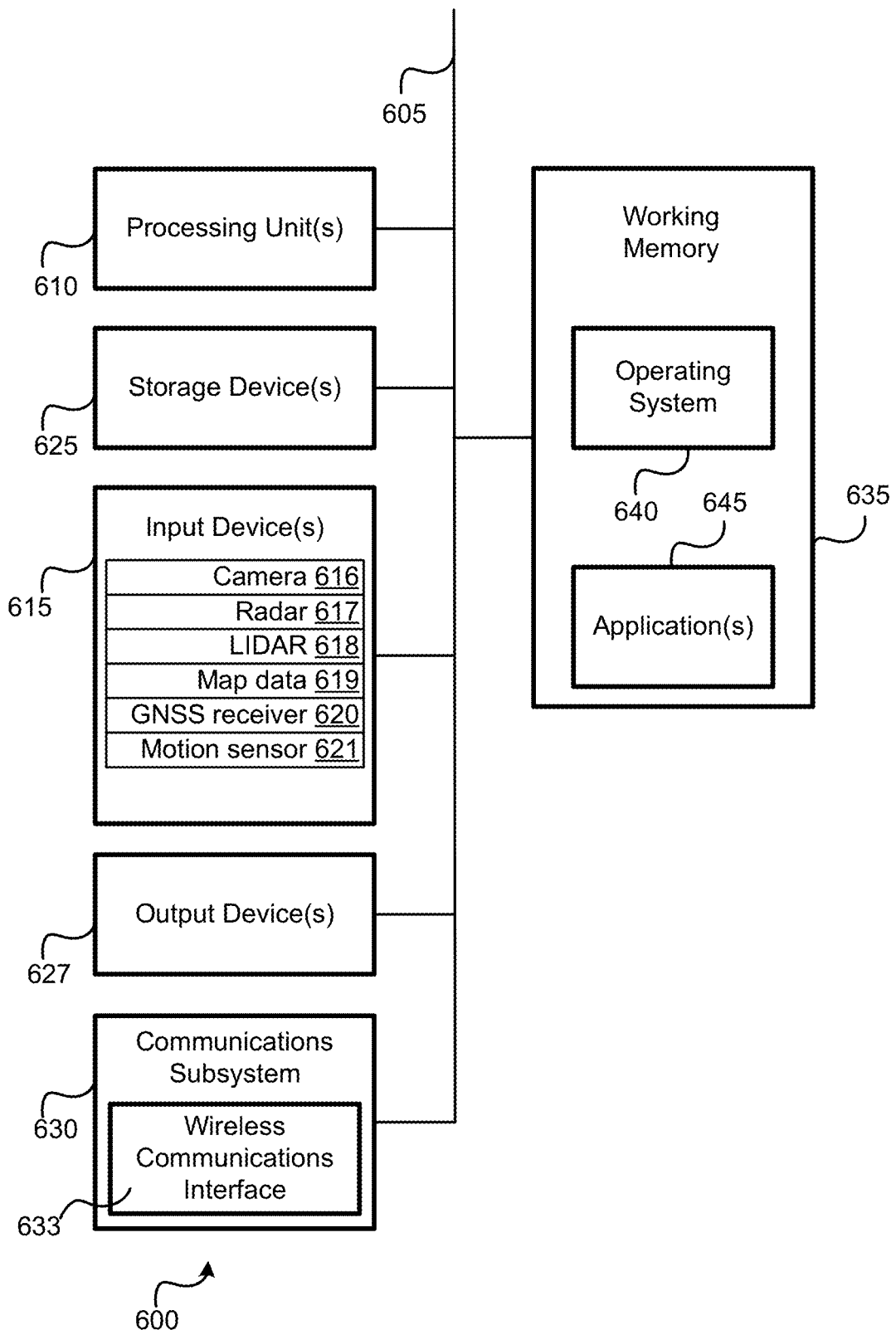
FIG. 6 is a block diagram of an embodiment of a mobile computer system.

Means for performing the functionality of block 430 may include a bus 605, processing unit(s) 610, communications subsystem 630 (including wireless communications interface 633), working memory 635, and/or other components of a mobile computing system 600 as illustrated in FIG. 6 and described in further detail below.

Figure 5:
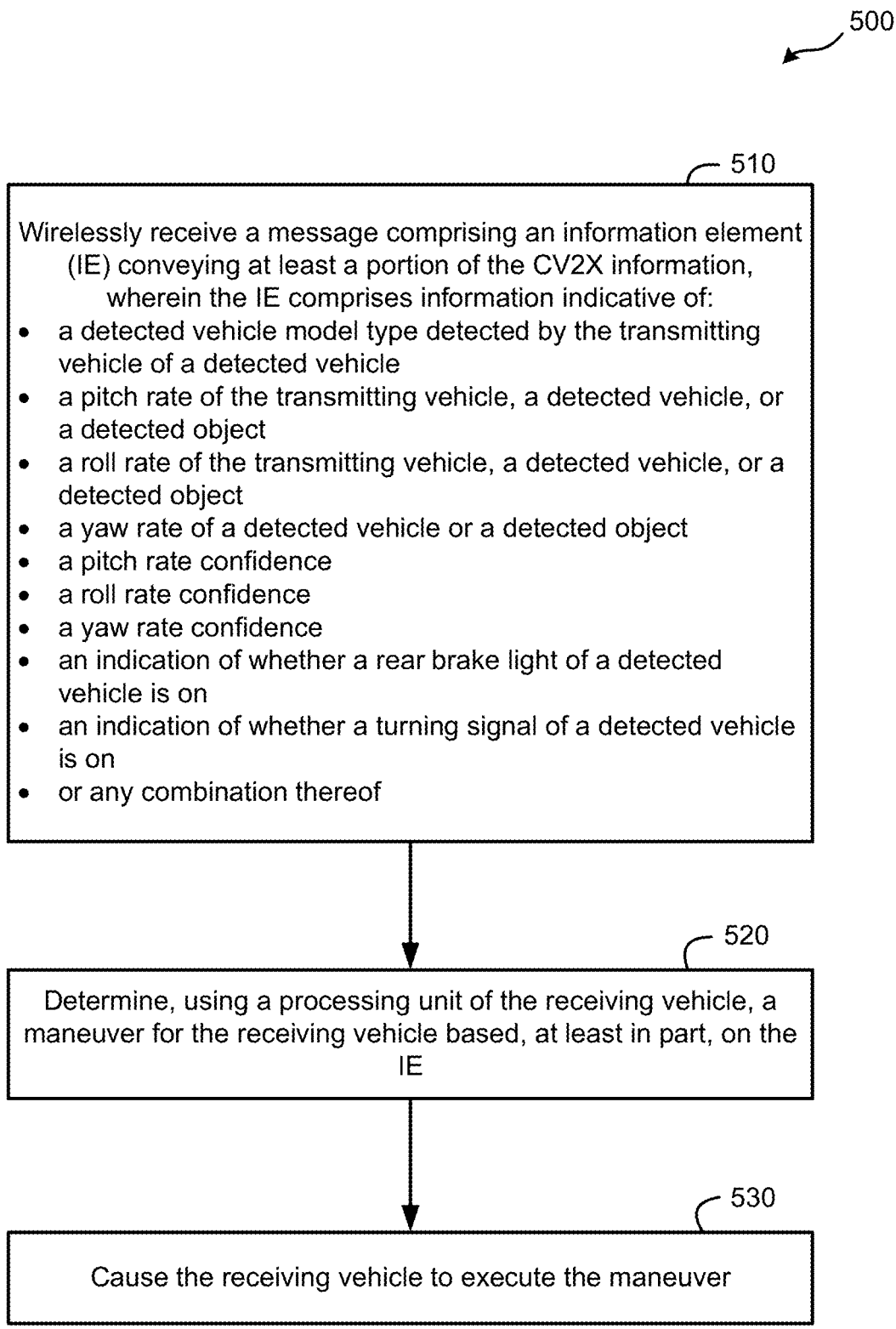
FIG. 5 is a flow diagram of a method, performed at a receiving vehicle, of executing a vehicle maneuver based on V2X information received from a transmitting vehicle.

FIG. 5 is a flow diagram of a method 500, performed at a receiving vehicle, of executing a vehicle maneuver based on V2X information received from a transmitting vehicle. As with the method 400 illustrated in FIG. 4 embodiments may perform functions in alternative order, combine, separate, and/or rearrange the functions illustrated in the blocks of FIG. 5, and/or perform functions in parallel, depending on desired functionality. A person of ordinary skill in the art will appreciate such variations. Means for performing the functionality of one or more blocks illustrated in FIG. 5 can include sensor inputs 205 and/or an automated maneuver system 200 as illustrated in FIG. 2 and described above, for example. Either of these may be implemented by a processing unit and/or other hardware and/or software components of an on-vehicle computer system, such as the mobile computing system 600 of FIG. 6, described in further detail below.

At block 510, the functionality includes wirelessly receiving a message comprising an information element (IE) conveying at least a portion of the V2X information, wherein the IE comprises information indicative of a detected vehicle model type detected by the transmitting vehicle of a detected vehicle; a pitch rate of the transmitting vehicle, a detected vehicle, or a detected object; a roll rate of the transmitting vehicle, a detected vehicle, or a detected object; a yaw rate of a detected vehicle, or a detected object; a pitch rate confidence; a roll rate confidence; a yaw rate confidence; an indication of whether a rear brake light of a detected vehicle is on; or an indication of whether a turning signal of a detected vehicle is on; or any combination thereof. In some embodiments, the detected vehicle model type may comprise information regarding a type of vehicle, a vehicle model, a vehicle model trim, or any combination thereof. Means for performing the functionality of block 510 may include a bus 605, processing unit(s) 610, working memory 635, communications subsystem 630 (including wireless communications interface 633), and/or other components of a mobile computing system 600 as illustrated in FIG. 6 and described in further detail below.

At block 520, the functionality comprises determining, using a processing unit of the receiving vehicle, a maneuver for the receiving vehicle based, at least in part, on the IE. As previously noted, the IEs provided herein and described above can allow for additional information that provide an ego vehicle with additional information regarding environmental features—above and beyond traditional V2X information—that allow the ego vehicle to make more intelligent maneuvers. As previously indicated, such maneuvers can also be based on sensor information. As such, in some embodiments, the method 500 includes obtaining sensor information from one or more sensor inputs wherein determining the maneuver for their receiving vehicle is further based on the sensor information. The sensor inputs may comprise input from a camera, radar, LIDAR, map data, GNSS, motion sensor, or any combination thereof. Additionally or alternatively, vehicle information can also be used in the determination of a maneuver. Thus, in some embodiments, the method 500 may further comprise obtaining vehicle information from one or more vehicle inputs of the receiving vehicle, wherein determining the maneuver for the receiving vehicle is further based on the vehicle information. Such a vehicle information may comprise information regarding a current state of the receiving vehicle, information regarding an intended maneuver of the receiving vehicle, information regarding the current motion state of the receiving vehicle, or any combination thereof. Means for performing the functionality of block 520 may include a bus 605, processing unit(s) 610, input device(s) 615, working memory 635, and/or other components of a mobile computing system 600 as illustrated in FIG. 6 and described in further detail below.

At block 530, the functionality comprises causing the receiving vehicle to execute the maneuver. As indicated in the embodiments above, this may comprise sending information to one or more autonomous systems of the vehicle to execute maneuver. Means for performing the functionality of block 530 may therefore include a bus 605, processing unit(s) 610, working memory 635, and/or other components of a mobile computing system 600 as illustrated in FIG. 6 and described in further detail below.

FIG. 6 is a block diagram of an embodiment of a mobile computing system 600, which may be used to perform some or all of the functionality described in the embodiments herein, including the functionality of one or more of the blocks illustrated in FIGS. 4 and/or 5. The mobile computing system 600 may be located on and/or otherwise incorporated into a vehicle (e.g., a transmitting vehicle or receiving vehicle as described above with regard to FIGS. 4 and 5), and may include some or all of the components of the automated maneuver system 200 and/or sensor inputs 205 of FIG. 2. For example, the stages and components of the automated maneuver system 200 described above can be executed by processing unit(s) 610; the sensors providing the sensor inputs 205 may comprise the input device(s) 615; and so forth. A person of ordinary skill in the art will appreciate where additional or alternative components of FIG. 2 and FIG. 6 may overlap.

It should be noted that FIG. 6 is meant only to provide a generalized illustration of various components, any or all of which may be utilized as appropriate. FIG. 6, therefore, broadly illustrates how individual system elements may be implemented in a relatively separated or relatively more integrated manner. In addition, it can be noted that components illustrated by FIG. 6 can be localized to a single device and/or distributed among various networked devices, which may be disposed at different physical locations on a vehicle.

The mobile computing system 600 is shown comprising hardware elements that can be communicatively coupled via a bus 605 (or may otherwise be in communication, as appropriate). The hardware elements may include processing unit(s) 610, which can include without limitation one or more general-purpose processors, one or more special-purpose processors (such as a digital signal processor (DSP), graphical processing unit (GPU), application specific integrated circuit (ASIC), field-programmable gate array (FPGA), and/or the like), and/or other processing structure, which can be configured to perform one or more of the methods described herein, including at least a portion of the methods described in FIGS. 4 and 5. The mobile computing system 600 also can include one or more input devices 615, which can include input from a Controller Area Network (CAN) bus (and/or another source of data for various vehicle systems) Additionally or alternatively, the input devices can include (as shown in FIG. 6 and described herein) a camera 616, radar 617, LIDAR 618, map data 619 (e.g., stored in a local database and/or received from a separate device), GNSS receiver 620, motion sensor 621 (e.g., an Inertial Measurement Unit (IMU) and/or one or more accelerometers, gyroscopes, etc.), and/or the like. The mobile computing system 600 can further comprise one or more output devices 627, which can include without limitation a display device, one or more vehicle automation and/or control systems, a navigation system, and/or the like.

The mobile computing system 600 may further include (and/or be in communication with) one or more non-transitory storage devices 625, which can comprise, without limitation, local and/or network accessible storage, and/or can include, without limitation, a disk drive, a drive array, an optical storage device, a solid-state storage device, such as a Random Access Memory (RAM), and/or a Read-Only Memory (ROM), which can be programmable, flash-updateable, and/or the like. Such storage devices may be configured to implement any appropriate data stores, including without limitation, various file systems, database structures, and/or the like.

The mobile computing system 600 may also include a communications subsystem 630, which can include support of communication technologies, including wireless communication technologies managed and controlled by a wireless communication interface 633. The communications subsystem 630 may include a modem, a network card (wireless or wired), an infrared communication device, a wireless communication device, and/or a chipset, and/or the like. The communications subsystem 630 may include one or more input and/or output communication interfaces, such as the wireless communication interface 633, to permit data to be exchanged with a wireless network, mobile devices, other computer systems, and/or other electronic devices. A wireless network may include a cellular network or other wireless wide area network (WWAN), a wireless local area network (WLAN), and/or the like.

In some embodiments, the wireless communication interface 633 may comprise one or more wireless transceivers enabling communications with devices and systems on the vehicle on which the mobile computing system 600 is located, other vehicles and infrastructure-related devices as detailed herein, and/or any system or device connected to a data communication network with which wireless communications via the wireless communications interface 633 is enabled. In some embodiments, the wireless communication interface 633 may comprise a Bluetooth transceiver, a ZigBee transceiver, or other Personal Area Network (PAN) transceiver. In some embodiments, the wireless communication interface 633 may comprise a Wide Area Network (WAN) transceiver enabling communications with a cellular network via cellular base station cell base station, and/or enabling direct cellular communications (e.g., CV2X communications) with other vehicles, infrastructure devices, and the like. In some embodiments, the wireless communication interface 633 may comprise a comprise a transceiver providing wireless communications with a wireless local area network (WLAN, e.g., IEEE 802.11 network). Examples of with which the wireless communications interface 633 may communicate are Global System for Mobile Communications (GSM), Code-division multiple access (CDMA), Wideband CDMA (WCDMA), LTE, 5G or New Radio Access Technology (NR), High Rate Packet Data (HRPD), and/or other forms of V2X communication. As noted, V2X communication protocols may be defined in various standards such as SAE and ETS-ITS standards. GSM, WCDMA LTE, and 5G are technologies defined by 3rd Generation Partnership Project (3GPP). CDMA and HRPD are technologies defined by the 3rd Generation Partnership Project II (3GPP2). WCDMA is also part of the Universal Mobile Telecommunications System (UMTS) and may be supported by a Home Node B (HNB). Of course, it should be understood that these are merely examples of communication enabled by the wireless communications interface 633, and claimed subject matter is not limited in this respect.

In many embodiments, the mobile computing system 600 will further comprise a working memory 635, which can include a RAM and/or or ROM device. Software elements, shown as being located within the working memory 635, can include an operating system 640, device drivers, executable libraries, and/or other code, such as application(s) 645, which may comprise computer programs provided by various embodiments, and/or may be designed to implement methods, and/or configure systems, provided by other embodiments, as described herein. Merely by way of example, one or more procedures described with respect to the method(s) discussed above, such as the methods described in relation to FIGS. 4 and 5, may be implemented (in whole or in part) as code and/or instructions that are stored (e.g. temporarily) in working memory 635 and are executable by a computer (and/or a processing unit within a computer such as processing unit(s) 610); in an aspect, then, such code and/or instructions can be used to configure and/or adapt a general purpose computer (or other device) to perform one or more operations in accordance with the described methods.

A set of these instructions and/or code might be stored on a non-transitory computer-readable storage medium, such as the storage device(s) 625 described above. In some cases, the storage medium might be incorporated within a computer system, such as mobile computing system 600. In other embodiments, the storage medium might be separate from a computer system (e.g., a removable medium, such as an optical disc), and/or provided in an installation package, such that the storage medium can be used to program, configure, and/or adapt a general purpose computer with the instructions/code stored thereon. These instructions might take the form of executable code, which is executable by the mobile computing system 600 and/or might take the form of source and/or installable code, which, upon compilation and/or installation on the mobile computing system 600 (e.g., using any of a variety of generally available compilers, installation programs, compression/decompression utilities, etc.), then takes the form of executable code.

It will be apparent to those skilled in the art that substantial variations may be made in accordance with specific requirements. For example, customized hardware might also be used, and/or particular elements might be implemented in hardware, software (including portable software, such as applets, etc.), or both. Further, connection to other computing devices such as network input/output devices may be employed.

With reference to the appended figures, components that can include memory can include non-transitory machine-readable media. The term "machine-readable medium" and "computer-readable medium" as used herein, refer to any storage medium that participates in providing data that causes a machine to operate in a specific fashion. In embodiments provided hereinabove, various machine-readable media might be involved in providing instructions/code to processing units and/or other device(s) for execution. Additionally or alternatively, the machine-readable media might be used to store and/or carry such instructions/code. In many implementations, a computer-readable medium is a physical and/or tangible storage medium. Such a medium may take many forms, including but not limited to, non-volatile media, volatile media, and transmission media. Common forms of computer-readable media include, for example, magnetic and/or optical media, any other physical medium with patterns of holes, a RAM, a PROM, EPROM, a FLASH-EPROM, any other memory chip or cartridge, a carrier wave as described hereinafter, or any other medium from which a computer can read instructions and/or code.

The methods, systems, and devices discussed herein are examples. Various embodiments may omit, substitute, or add various procedures or components as appropriate. For instance, features described with respect to certain embodiments may be combined in various other embodiments. Different aspects and elements of the embodiments may be combined in a similar manner. The various components of the figures provided herein can be embodied in hardware and/or software. Also, technology evolves and, thus, many of the elements are examples that do not limit the scope of the disclosure to those specific examples.

It has proven convenient at times, principally for reasons of common usage, to refer to such signals as bits, information, values, elements, symbols, characters, variables, terms, numbers, numerals, or the like. It should be understood, however, that all of these or similar terms are to be associated with appropriate physical quantities and are merely convenient labels. Unless specifically stated otherwise, as is apparent from the discussion above, it is appreciated that throughout this Specification discussions utilizing terms such as "processing," "computing," "calculating," "determining," "ascertaining," "identifying," "associating," "measuring," "performing," or the like refer to actions or processes of a specific apparatus, such as a special purpose computer or a similar special purpose electronic computing device. In the context of this Specification, therefore, a special purpose computer or a similar special purpose electronic computing device is capable of manipulating or transforming signals, typically represented as physical electronic, electrical, or magnetic quantities within memories, registers, or other information storage devices, transmission devices, or display devices of the special purpose computer or similar special purpose electronic computing device.

Terms, "and" and "or" as used herein, may include a variety of meanings that also is expected to depend at least in part upon the context in which such terms are used. Typically, "or" if used to associate a list, such as A, B, or C, is intended to mean A, B, and C, here used in the inclusive sense, as well as A, B, or C, here used in the exclusive sense. In addition, the term "one or more" as used herein may be used to describe any feature, structure, or characteristic in the singular or may be used to describe some combination of features, structures, or characteristics. However, it should be noted that this is merely an illustrative example and claimed subject matter is not limited to this example. Furthermore, the term "at least one of" if used to associate a list, such as A, B, or C, can be interpreted to mean any combination of A, B, and/or C, such as A, AB, AA, AAB, AABBCCC, etc.

Having described several embodiments, various modifications, alternative constructions, and equivalents may be used without departing from the spirit of the disclosure. For example, the above elements may merely be a component of a larger system, wherein other rules may take precedence over or otherwise modify the application of the various embodiments. Also, a number of steps may be undertaken before, during, or after the above elements are considered. Accordingly, the above description does not limit the scope of the disclosure.

What is claimed is:

1. A method of transmitting one or more vehicle-based messages, the method comprising:
    obtaining, at a first vehicle, sensor information from one or more sensor inputs and at least one vehicle-to-everything (V2X) message;
    detecting, from the sensor information and the at least one V2X message and using a processing unit of the first vehicle, V2X information associated with a second vehicle, the detected V2X information including:
        a detected vehicle model type of the second vehicle;
        a detected pitch rate of the second vehicle, the detected pitch rate including an angular velocity about a first axis;
        a detected roll rate of the second vehicle, the detected roll rate including an angular velocity about a second axis;
        a detected yaw rate of the second vehicle, the detected yaw rate including an angular velocity about a third axis;
        a pitch rate confidence of the detected pitch rate;
        a roll rate confidence of the detected roll rate; and
        a yaw rate confidence of the detected yaw rate;
    creating, using the processing unit of the first vehicle, a message comprising an information element (IE) including the detected V2X information; and
    wirelessly transmitting, from the first vehicle, the message comprising the IE to at least one other vehicle.

2. The method of claim 1, wherein the one or more sensor inputs comprise input from:
    a camera,
    a radar,
    a LIDAR,
    map data,
    a Global Navigation Satellite System (GNSS), or
    a motion sensor, or
    any combination thereof.

3. The method of claim 1, wherein the message comprises a Basic Safety Message as defined by the Society of Automotive Engineers (SAE) or a Collective Perception Message as defined by the European Telecommunications Standards Institute (ETSI).

4. The method of claim 3, wherein the IE is included as a DF DetectedObject in the Basic Safety Message or as a Perceived Object Container in the Collective Perception Message.

5. A method of executing a vehicle maneuver at a first vehicle, the method comprising:
    wirelessly receiving a message comprising an information element (IE) conveying vehicle-to-everything (V2X) information associated with a detected vehicle, wherein the V2X information is detected by a second vehicle based on sensor information and at least one V2X message, wherein the V2X information comprises:
        a detected vehicle model type of the detected vehicle;
        a detected pitch rate of the detected vehicle, the detected pitch rate including an angular velocity about a first axis;
        a detected roll rate of the detected vehicle, the detected roll rate including an angular velocity about a second axis;
        a detected yaw rate of the detected vehicle, the detected yaw rate including an angular velocity about a third axis;
        a pitch rate confidence of the detected pitch rate;
        a roll rate confidence of the detected roll rate; and
        a yaw rate confidence of the detected yaw rate;
    determining, using a processing unit of the first vehicle, a maneuver for the first vehicle based, at least in part, on the IE; and
    causing the first vehicle to execute the maneuver.

6. The method of claim 5, further comprising obtaining the sensor information from one or more sensor inputs, wherein determining the maneuver for the first vehicle is further based on the sensor information.

7. The method of claim 6, wherein the one or more sensor inputs comprise input from:
    a camera,
    a radar,
    a LIDAR,
    map data,
    a Global Navigation Satellite System (GNSS), or
    a motion sensor, or
    any combination thereof.

8. The method of claim 5, further comprising obtaining vehicle information from one or more vehicle inputs of the first vehicle, wherein determining the maneuver for the first vehicle is further based on the vehicle information.

9. The method of claim 8, wherein the vehicle information comprises:
    information regarding a current state of the first vehicle,
    information regarding an intended maneuver of the first vehicle, or
    information regarding a current motion state of the first vehicle, or
    any combination thereof.

10. The method of claim 5, wherein the message comprises a Basic Safety Message as defined by the Society of Automotive Engineers (SAE) or a Collective Perception Message as defined by the European Telecommunications Standards Institute (ETSI).

11. The method of claim 10, wherein the IE is included as a DF DetectedObject in the Basic Safety Message or as a Perceived Object Container in the Collective Perception Message.

12. The method of claim 5, wherein determining the maneuver for the first vehicle is further based on one or more objects, vehicles, or both, detected by one or more sensors of the first vehicle.

13. A mobile computer system comprising:
    a wireless communication interface;
    a memory; and
    one or more processing units communicatively coupled to the wireless communication interface and the memory, wherein the one or more processing units are configured to:
        obtain sensor information from one or more sensor inputs and at least one vehicle-to-everything (V2X) message;
        detect, from the sensor information and the at least one V2X message, V2X information associated with a second vehicle, the detected V2X information including:
            a detected vehicle model type of the second vehicle;
            a detected pitch rate of the second vehicle, the detected pitch rate including an angular velocity about a first axis;
            a detected roll rate of the second vehicle, the detected roll rate including an angular velocity about a second axis;
            a detected yaw rate of the second vehicle, the detected yaw rate including an angular velocity about a third axis;

a pitch rate confidence of the detected pitch rate;
a roll rate confidence of the detected roll rate; and
a yaw rate confidence of the detected yaw rate;
create a message comprising an information element (IE) including the detected V2X information; and
wirelessly transmit the message comprising the IE using the wireless communication interface.

14. The mobile computer system of claim 13, wherein the one or more sensor inputs from which the one or more processing units are configured to obtain the sensor information comprise:
a camera,
a radar,
a LIDAR,
map data,
a Global Navigation Satellite System (GNSS), or
a motion sensor, or
any combination thereof.

15. The mobile computer system of claim 13, wherein, to create the message, the one or more processing units are configured to create a Basic Safety Message as defined by the Society of Automotive Engineers (SAE) or a Collective Perception Message as defined by the European Telecommunications Standards Institute (ETSI).

16. The mobile computer system of claim 15, wherein the one or more processing units are configured to include the IE as a DF DetectedObject in the Basic Safety Message or as a Perceived Object Container in the Collective Perception Message.

17. A mobile computer system comprising:
a wireless communication interface;
a memory; and
one or more processing units communicatively coupled to the wireless communication interface and the memory, wherein the one or more processing units are configured to:
wirelessly receive a message, via the wireless communication interface, comprising an information element (IE) conveying at least a portion of vehicle-to-everything (V2X) information associated with a detected vehicle, wherein the V2X information is detected by a second vehicle based on sensor information and at least one V2X message included in the message, wherein the IE comprises:
a detected vehicle model type of the detected vehicle;
a detected pitch rate of the detected vehicle, the detected pitch rate including an angular velocity about a first axis;
a detected roll rate of the detected vehicle, the detected roll rate including an angular velocity about a second axis;
a detected yaw rate of the detected vehicle, the detected yaw rate including an angular velocity about a third axis;
a pitch rate confidence of the detected pitch rate;
a roll rate confidence of the detected roll rate; and
a yaw rate confidence of the detected yaw rate;
determine a maneuver for a receiving vehicle based, at least in part, on the IE; and
cause the receiving vehicle to execute the maneuver.

18. The mobile computer system of claim 17, wherein:
the one or more processing units are further configured to obtain the sensor information from one or more sensor inputs; and
the one or more processing units are further configured to base the determination of the maneuver for the receiving vehicle on the sensor information.

19. The mobile computer system of claim 18, wherein the one or more sensor inputs from which the one or more processing units are configured to obtain the sensor information comprise:
a camera,
a radar,
a LIDAR,
map data,
a Global Navigation Satellite System (GNSS), or
a motion sensor, or
any combination thereof.

20. The mobile computer system of claim 17, wherein:
the one or more processing units are further configured to obtain vehicle information from one or more vehicle inputs of the receiving vehicle; and
the one or more processing units are further configured to base the determination of the maneuver for the receiving vehicle on the vehicle information.

21. The mobile computer system of claim 20, to obtain the vehicle information, the one or more processing units are further configured to obtain:
information regarding a current state of the receiving vehicle,
information regarding an intended maneuver of the receiving vehicle, or
information regarding a current motion state of the receiving vehicle, or
any combination thereof.

22. The mobile computer system of claim 17, wherein, to wirelessly receive the message, the one or more processing units are configured to wirelessly receive a Basic Safety Message as defined by the Society of Automotive Engineers (SAE) or a Collective Perception Message as defined by the European Telecommunications Standards Institute (ETSI).

23. The mobile computer system of claim 22, wherein the one or more processing units are configured to obtain the IE from a DF DetectedObject in the Basic Safety Message or a Perceived Object Container in the Collective Perception Message.

24. The mobile computer system of claim 17, wherein the one or more processing units are further configured to base the determination of the maneuver for the receiving vehicle on one or more objects, vehicles, or both, detected by one or more sensors of the receiving vehicle.

* * * * *